US012347941B2

(12) United States Patent
Odes

(10) Patent No.: US 12,347,941 B2
(45) Date of Patent: Jul. 1, 2025

(54) ULTRA WIDEBAND ANTENNA INCLUDING PARTIAL CAVITY AND FOLDED SLOT

(71) Applicant: GM GLOBAL TECHNOLOGY OPERATIONS LLC, Detroit, MI (US)

(72) Inventor: Uriel Zvi Odes, Givaat Shmuel (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 135 days.

(21) Appl. No.: 18/305,534

(22) Filed: Apr. 24, 2023

(65) Prior Publication Data

US 2024/0356219 A1 Oct. 24, 2024

(51) Int. Cl.

| | |
|---|---|
| ***H01Q 5/25*** | (2015.01) |
| ***H01Q 1/32*** | (2006.01) |
| ***H01Q 1/48*** | (2006.01) |
| ***H01Q 13/16*** | (2006.01) |

(52) U.S. Cl.
CPC ................ *H01Q 5/25* (2015.01); *H01Q 1/32* (2013.01); *H01Q 1/48* (2013.01); *H01Q 13/16* (2013.01)

(58) Field of Classification Search
CPC ........... H01Q 13/18; H01Q 5/25; H01Q 1/32; H01Q 13/16
See application file for complete search history.

(56) References Cited

FOREIGN PATENT DOCUMENTS

| | | | | |
|---|---|---|---|---|
| CN | 110350308 A * | 10/2019 | ............... | H01Q 1/36 |
| KR | 2048997 B1 * | 11/2019 | ............. | H01Q 13/02 |
| WO | WO-2023058791 A1 * | 4/2023 | ............... | H01Q 1/32 |

* cited by examiner

*Primary Examiner* — Dameon E Levi
*Assistant Examiner* — Anna N Hamadyk

(57) ABSTRACT

An ultra wide band (UWB) antenna includes: a planar cap portion that is parallel to a ground plane; a tapered portion that extends vertically away from the cap portion and toward the ground plane and that forms a cavity vertically between a bottom surface of the tapered portion and the ground plane; and a side portion that extends vertically from the cap portion toward the ground plane and that electrically connects to a feed at a point that is vertically above the cavity.

19 Claims, 10 Drawing Sheets

FIG. 1A
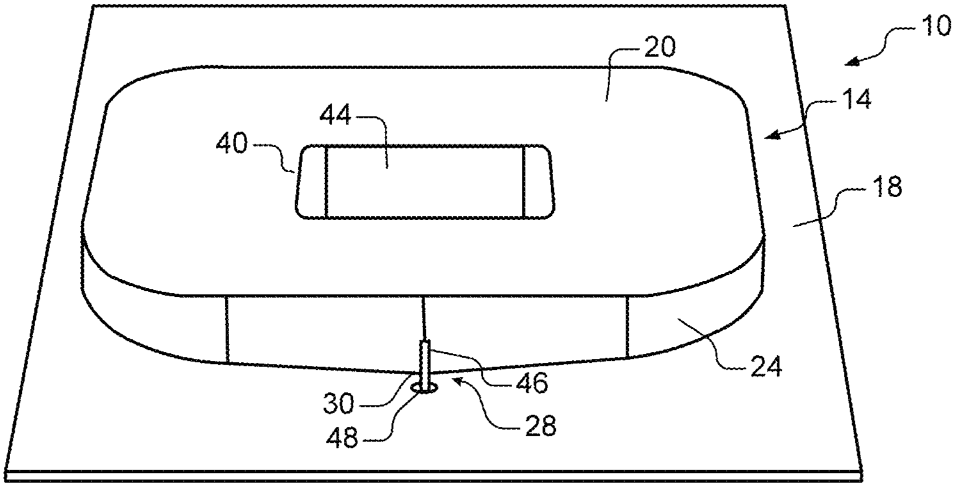
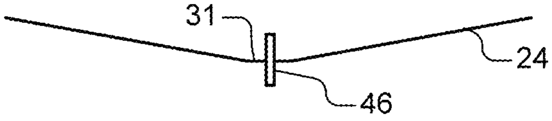
FIG. 1B
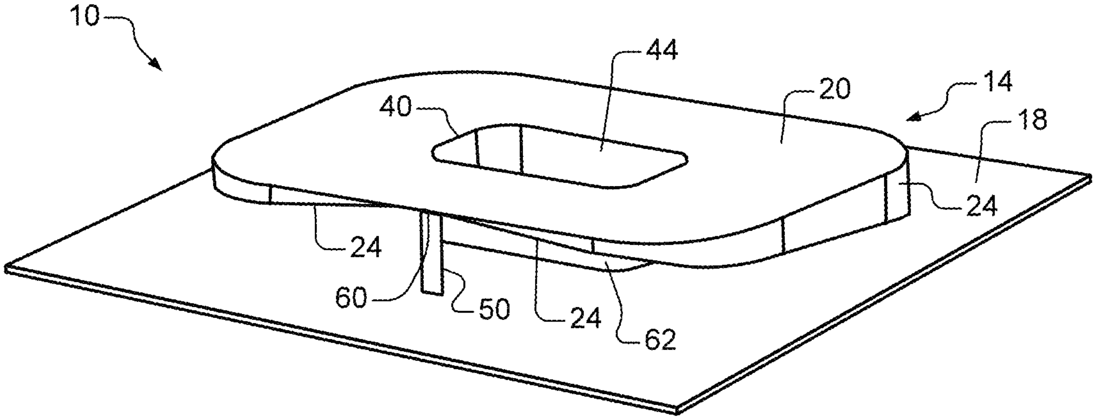
FIG. 2A

ULTRA WIDEBAND ANTENNA INCLUDING PARTIAL CAVITY AND FOLDED SLOT

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to antennas and more particularly to ultra wide band antennas.

Vehicles use telematics systems to support wireless telecommunications and information processing. Examples include cellular communications, global positioning system (GPS) navigation, integrated hands-free cell phones, wireless safety communication, vehicle to vehicle (V2V) communication, vehicle to infrastructure (V2I) communication, autonomous driving systems, etc.

The telematics systems transmit and receive data as the vehicle is driven on the road. To facilitate wireless connectivity, the vehicles include one or more antennas that are connected to transmitters and/or receivers of the telematics systems. Examples of antennas that may be used include mast antennas and shark fin antennas. Various sub-systems in the telematics systems transmit and receive on multiple different frequency bands. Ultra wide band (UWB) antennas may be a good candidate for cellular applications.

Manufacturers attempt to create cost-effective, fuel-efficient vehicles with attractive styling. Some antenna designs are typically not desirable from a styling viewpoint. For example, the shark fin antenna may be arranged on the roof of the vehicle above a middle of the rear windshield or on the rear deck lid. As can be appreciated, placing the shark fin antenna in those locations detracts from the external design of the vehicle. These types of antennas typically have a height that is approximately one quarter of a wavelength at a lowest desired operating frequency.

SUMMARY

In a feature, an ultra wide band (UWB) antenna includes: a planar cap portion that is parallel to a ground plane; a tapered portion that extends vertically away from the cap portion and toward the ground plane and that forms a cavity vertically between a bottom surface of the tapered portion and the ground plane; and a side portion that extends vertically from the cap portion toward the ground plane and that electrically connects to a feed at a point that is vertically above the cavity.

In further features, the tapered portion includes a cavity backed portion that extends away from the tapered portion toward the plane of the cap portion and that forms a second cavity vertically between the cavity backed portion and the ground plane.

In further features, the cavity backed portion includes a planar portion that lies on a plane that is parallel to the ground plane and parallel to the plane of the cap portion.

In further features, the plane on the planar portion is disposed between (a) the ground plane and (b) the plane of the cap portion.

In further features, a connecting portion is disposed between the cap portion and the ground plane and that electrically connects the cap portion to the ground plane.

In further features, the UWB antenna is symmetrical about a vertical plane through (a) a center of the connecting portion and (b) the feed.

In further features, the side portion is perpendicular to the cap portion and the ground plane.

In further features, at least portions of the side portion are disposed vertically above portions of the tapered portion.

In further features, the side portion includes at least six curved portions.

In further features, the side portion includes at least 6 portions that are vertically planar.

In further features, the side portion includes eight curved portions.

In further features, at least two of the curved portions intersect a vertical plane of an edge of the tapered portion.

In further features, none of the cap portion is disposed vertically above the tapered portion.

In further features, a vertical height of the side portion varies.

In further features, a vertical distance between (a) a lower portion of the side portion and (b) the ground plane varies.

In further features, a vertical height of the side portion both increases and decreases at different portions of the side portion.

In further features, a vertical distance between (a) a lower portion of the side portion and (b) the ground plane both increases and decreases at different portions of the side portion.

In further features, a vertical distance between (a) a lower edge of the side portion and (b) the ground plane increases approaching a connecting portion that is electrically connected to the ground plane.

In further features, the planar cap portion, the tapered portion and the side portion are all made of an electrically conductive material.

In a feature, a vehicle includes: the feed; and the UWB antenna.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 1A is a perspective view of a feed side of an example of an ultra wide band (UWB) antenna arranged above a ground plane according to the present disclosure;

FIG. 1B is a side view illustrating another example of the tapered side portion near the feed point according to the present disclosure;

FIGS. 2A to 2C are perspective views of examples of a back side of the UWB antenna of FIGS. 1A and 1B.

In the drawings, reference numbers may be reused to identify similar and/or identical elements.

DETAILED DESCRIPTION

Figure 2B:
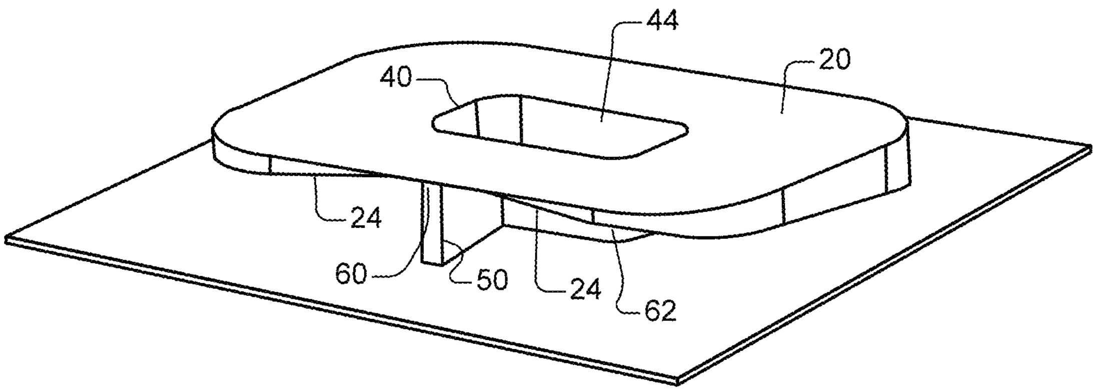

An ultra wide band (UWB) antenna according to the present disclosure has an extremely low profile, which allows the UWB antenna to be incorporated into a variety of different locations. The extremely low profile allows the UWB antenna to be placed in less noticeable internal or external vehicle locations. For example, the UWB antenna can be concealed in a cavity in the roof below a non-conducting roof material and above a conducting plane (which may be the same as or different than the ground plane of the antenna), which improves the exterior design of the vehicle.

Referring now to FIGS. 1A to 2C, an example UWB antenna 10 is shown. In FIG. 1A, the UWB antenna 10 includes an antenna body 14 that is arranged above a ground plane 18. Somewhat different than the examples discussed further below, the antenna body 14 includes a planar portion 20 and a tapered side portion 24 that extends from a bottom surface of the planar portion 20 towards the ground plane 18. In some examples, the planar portion 20 has a rounded rectangular shape, an elliptical shape or a circular shape.

In some examples, an opening 40 is formed in the planar portion 20 and has a shape that is similar to a shape of the outer edge of the planar portion 20, although other shapes can be used. For example, the opening 40 may have a rounded rectangular shape, an elliptical shape or a circular shape.

In some examples, the opening 40 is centered relative to the planar portion 20. If the opening 40 is used, an upper edge of a cylinder 44 is connected to a bottom surface of the planar portion 20 at the opening 40 and a lower edge of the cylinder 44 is connected to the ground plane 18. In other examples, the opening 40 can be omitted. If the opening 40 is omitted, a top portion of the cylinder 44 can be attached to a bottom surface of the planar portion 20.

In some examples, the cylinder 44 is a rounded rectangular cylinder, an elliptical cylinder or a circular cylinder. In some examples, the cross-sectional shape and size of the cylinder 44 matches a shape of the opening 40. The cylinder 44 is connected to the bottom surface of the planar portion 20 along an edge of the opening 40 or radially outside of the opening 40 to provide electrical continuity between the planar portion 20 and the cylinder 40.

In some examples, the tapered side portion 24 is connected at or near the outer edge of the planar portion 20 and wraps fully around the outer edge of the planar portion 20. In other examples, the tapered side portion 24 is connected at or near the outer edge of the planar portion 20 and wraps around greater than or equal to 90% of the edge of the planar portion 20. In still other examples, the tapered side portion 24 wraps around at least 50% of the outer edge of the planar portion (or at least 25% at or near the outer edge of the planar portion in both directions when starting from the antenna feed on the feed side).

The tapered side portion 24 has a height that varies around the outer edge of the planar portion 20. In the example of FIG. 1A, the height of the tapered side portion 24 decreases or tapers from a center 30 of the tapered side portion 24 on the feed side shown in FIG. 1A (where the tapered side portion 24 has its greatest height) to a location at or near a center 60 of the tapered side portion 24 on the back side shown in FIG. 2A (where the tapered side portion 24 has its shortest height). In other words, the gap between the lower edge of the tapered side portion 24 and the ground plane 18 varies. A vertical height of the gap increases from the center 30 of the tapered side portion 24 on the feed side shown in FIG. 1A to a location at or near the center 60 of the tapered side portion 24 on the back side shown in FIG. 2A where the gap has a largest vertical height.

Figure 2C:
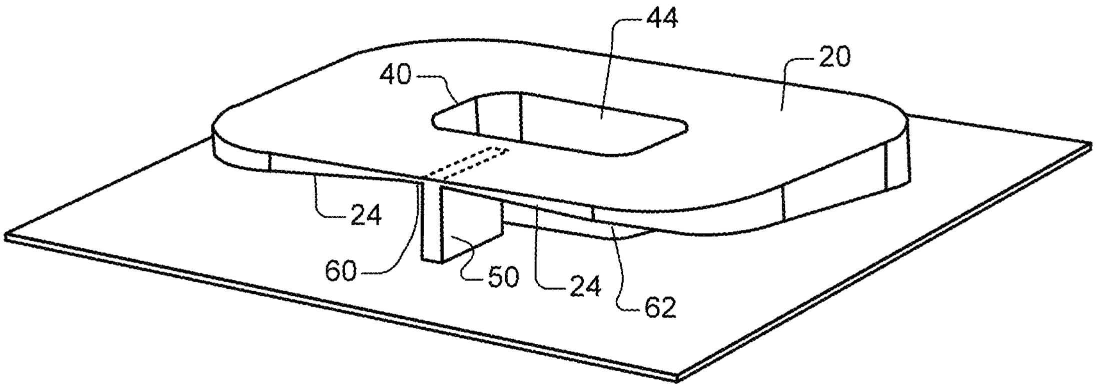

In some examples, the height of the tapered side portion 24 tapers fully at the center 60 as shown in FIG. 2A. In other examples, the tapered side portion 24 does not taper fully at the center as shown in FIG. 2C. Alternatively, the tapered side portion 24 tapers from a center 30 on the feed side shown in FIG. 1 and ends prior to reaching the center 60 as shown in FIG. 2B. In some examples, the height of the tapered side portion 24 monotonically decreases.

The antenna body 14 is mounted to the ground plane 18 and a gap 28 is defined between the center 30 of the tapered side portion 24 on the feed side and the ground plane 18. In some examples, an antenna feed 46 extends through an opening 48 formed in the ground plane 18 and is connected to the antenna body 14 at the center 30 of the feed side. For example only, the antenna feed 46 can include an inner conductor of a coaxial cable and a woven copper shield (not shown) of the coaxial cable can be connected to the ground plane 18. The inner conductor of the coaxial cable may serve as the antenna feed 46 and be electrically connected to the antenna body 14. While a specific type of antenna feed is shown for illustration purposes, the antenna can be fed using other antenna feed arrangements. For example, rather than passing perpendicular through the ground plane, the antenna feed can be arranged and connected to the antenna body at the feed location parallel to and above the ground plane (and not pass through the ground plane).

In FIG. 1B, the tapered side portion 24 can optionally taper downwardly adjacent to the feed location and then transition to a non-tapered section 31 at the antenna feed location. In some examples, a transition between the tapered side portion 24 and the non-tapered section 31 can be rounded. In some examples, a lower edge of the non-tapered section 31 is arranged parallel to the ground plane. In some examples, the non-tapered section 31 has a horizontal width in range from 0.5 mm to 20 mm, although other widths may be used. The horizontal width of the non-tapered section 31 and the height of the gap 28 can be varied to influence the impedance of the UWB antenna at the antenna feed point.

The planar portion 20 lies in a plane that is generally parallel to and spaced above the ground plane 18. A connecting portion 50 is located on a back side of the antenna body 14 to connect the planar portion 20 and/or the tapered side portion 24 to the ground plane 18. In some examples, the connecting portion 50 includes a conducting portion that connects the planar portion 20 to the ground plane 18 but does not extend to the cylinder 44 (FIG. 2A). In other examples, the connecting portion 50 includes a conducting wall portion having a generally rectangular cross-section (in a radial direction of the planar portion 20). If the conducting wall is used, the connecting portion 50 is attached to a lower surface of the planar portion 20 near the center 60 of the planar portion 20 and extends fully (in FIG. 2B) or partially (FIG. 2C) to an outer surface 62 of the cylinder 44.

The antenna body 14 can be made entirely of an electrically conductive material such as a metal. Alternately, one or more portions of the antenna body 14 can include a supporting surface that is made of a non-conducting material and a layer made of a conducting material attached to, deposited on, or printed on the non-conducting material.

Without committing to a theory of operation, the UWB antennas described herein operate like a cavity-backed slotted antenna with opposite ends and the cavity wrapped around and connected together.

Some antenna designs may involve a height of the UWB antenna to be at least approximately one quarter (¼) of the wavelength corresponding to a lowest target operating frequency of the UWB antenna 10. In some examples, the UWB antennas discussed herein can be designed with a vertical height that is as low as approximately 1/20th of a wavelength corresponding to the lowest target operating frequency. As used herein, approximately 1/20th of a wavelength may refer to 4% to 6% of the wavelength corresponding to the lowest desired operating frequency. When height is less of a concern, the UWB antenna 10 can be designed with other vertical heights such as 1/10th of a wavelength corresponding to the lowest target operating frequency or other heights. Vertical height may refer to the distance between the ground plane and the vertical top most portion of the UWB antenna.

For example, the UWB antenna can be designed for 1.7 GHZ applications and can have a height of approximately 8-9 millimeters (mm). In some examples, the width W and length L of the UWB antenna is in a range from 0.5 to 5 times the height H of the UWB antenna. In some examples, the ground plane is wider than the L and W of the antenna body by first and second predetermined distances, respectively. The first and second predetermined distances are the same (symmetric) or different (asymmetric).

The UWB antenna 10 has a low profile. The relatively low height of the UWB antenna (e.g. approximately 1/20*wavelength) provides a significant advantage when attempting to locate the UWB antenna in unobtrusive locations to enhance the design and visual appearance of the vehicle. The increased height of other antennas makes it more difficult to locate in or on a vehicle without adversely impacting the design of the vehicle or reducing headroom when located between the headliner and roof.

For example only, the UWB antenna 10 may be designed for 617 megahertz (MHz) applications and can handle a first frequency band from 617 MHz to 960 MHZ, a second frequency band from 1.7 gigahertz (GHz) to 2.7 GHZ and a third frequency band from 3.3 GHz to 6 GHZ, although other frequencies ranges may be used.

In the UWB antenna 10 shown in FIGS. 1A to 2C, the UWB antenna 10 is arranged above the ground plane 18. In this design, the ground plane 18 may act similar to a mirror and reflect signals emitted by the UWB antenna 10.

Figure 3:
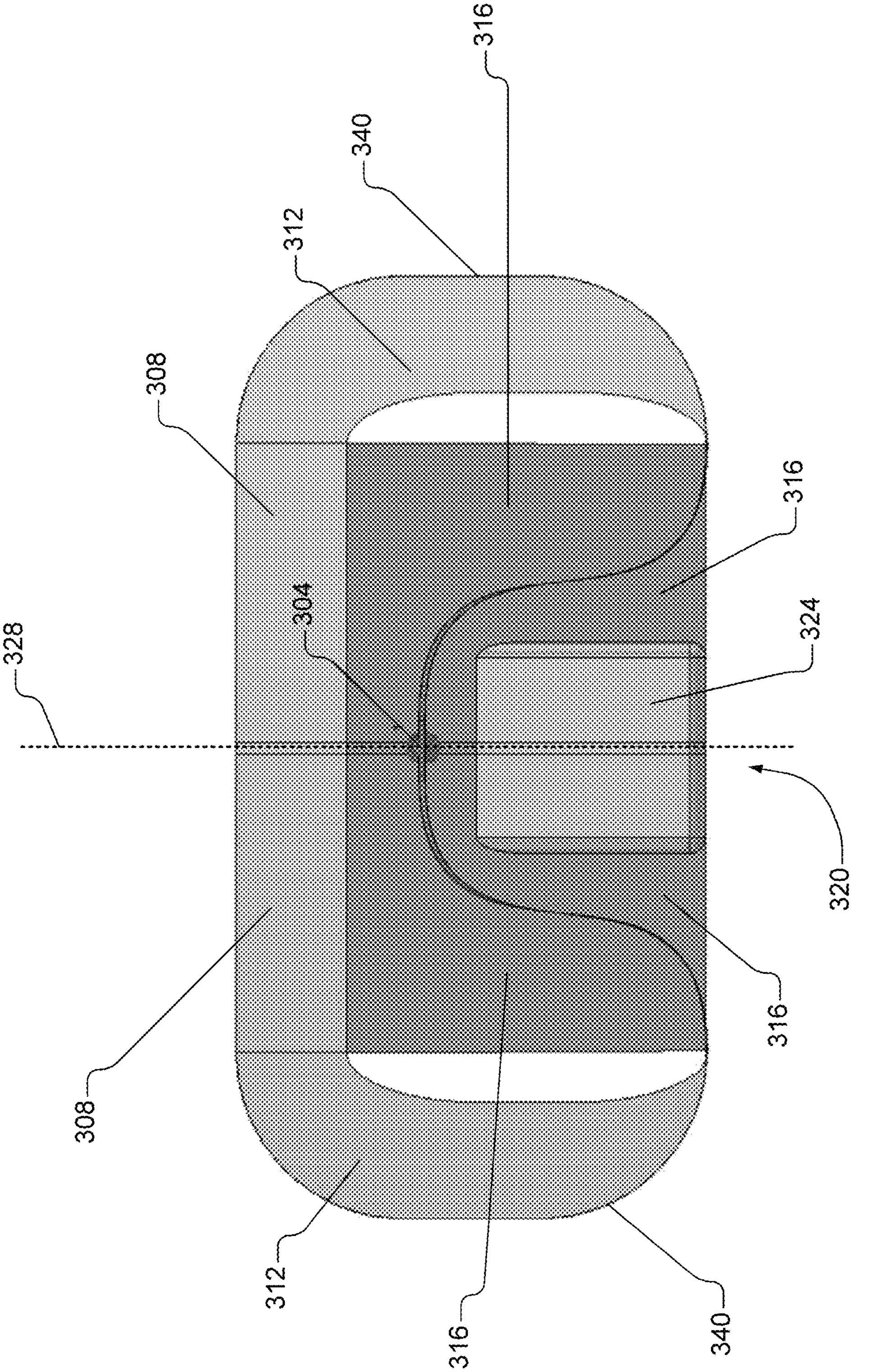
FIGS. 3-10 are example views of a UWB antenna.
Figure 4:
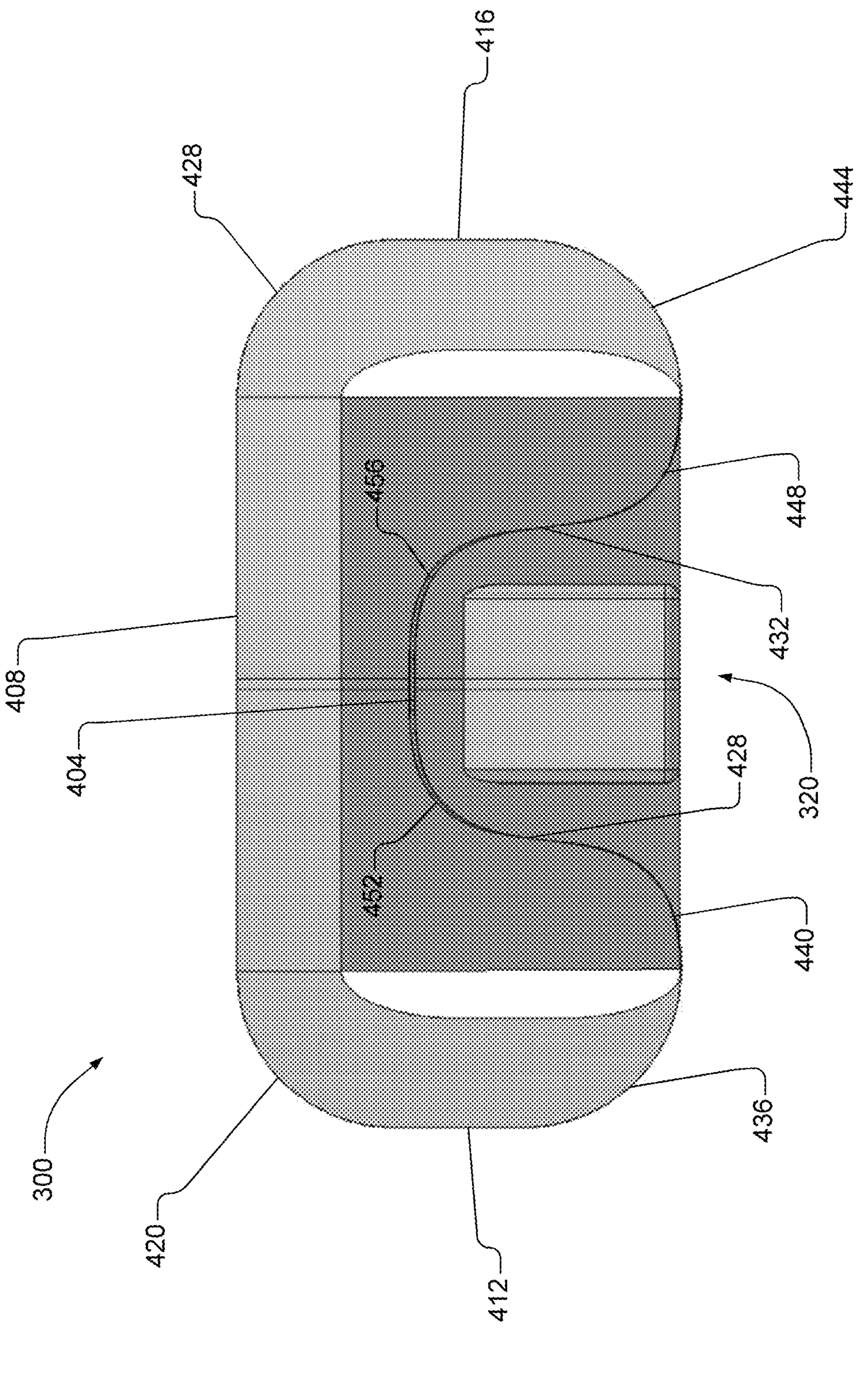

FIGS. 3 and 4 are top views of an example implementation of a UWB antenna 300 of the present application including multiple different antennas. FIG. 4 illustrates the UWB antenna 300 without RF feed connection 304. The UWB 300 (its components) are electrically conductive and may be made of a metal.

Figure 5:
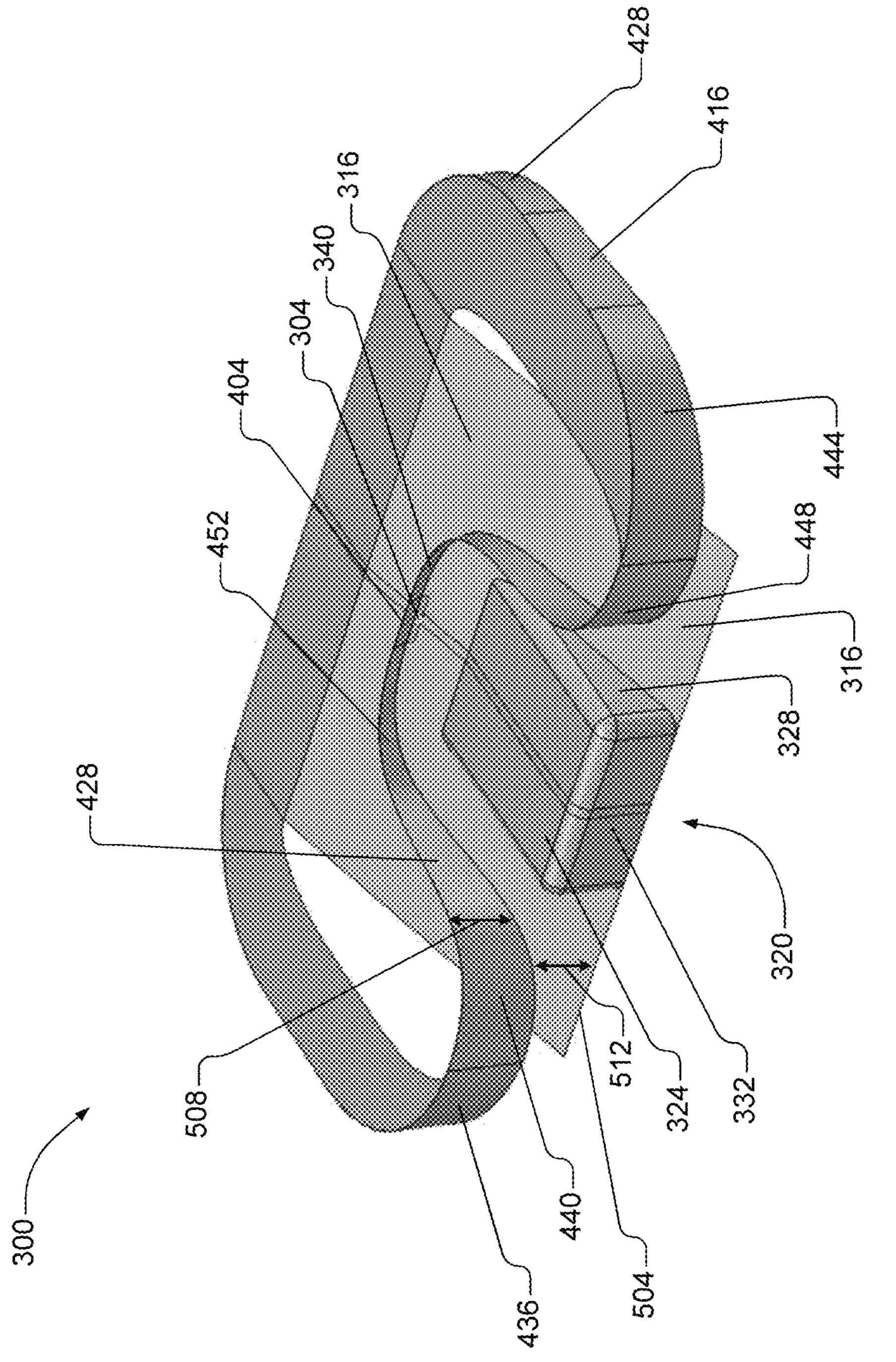
Figure 6:
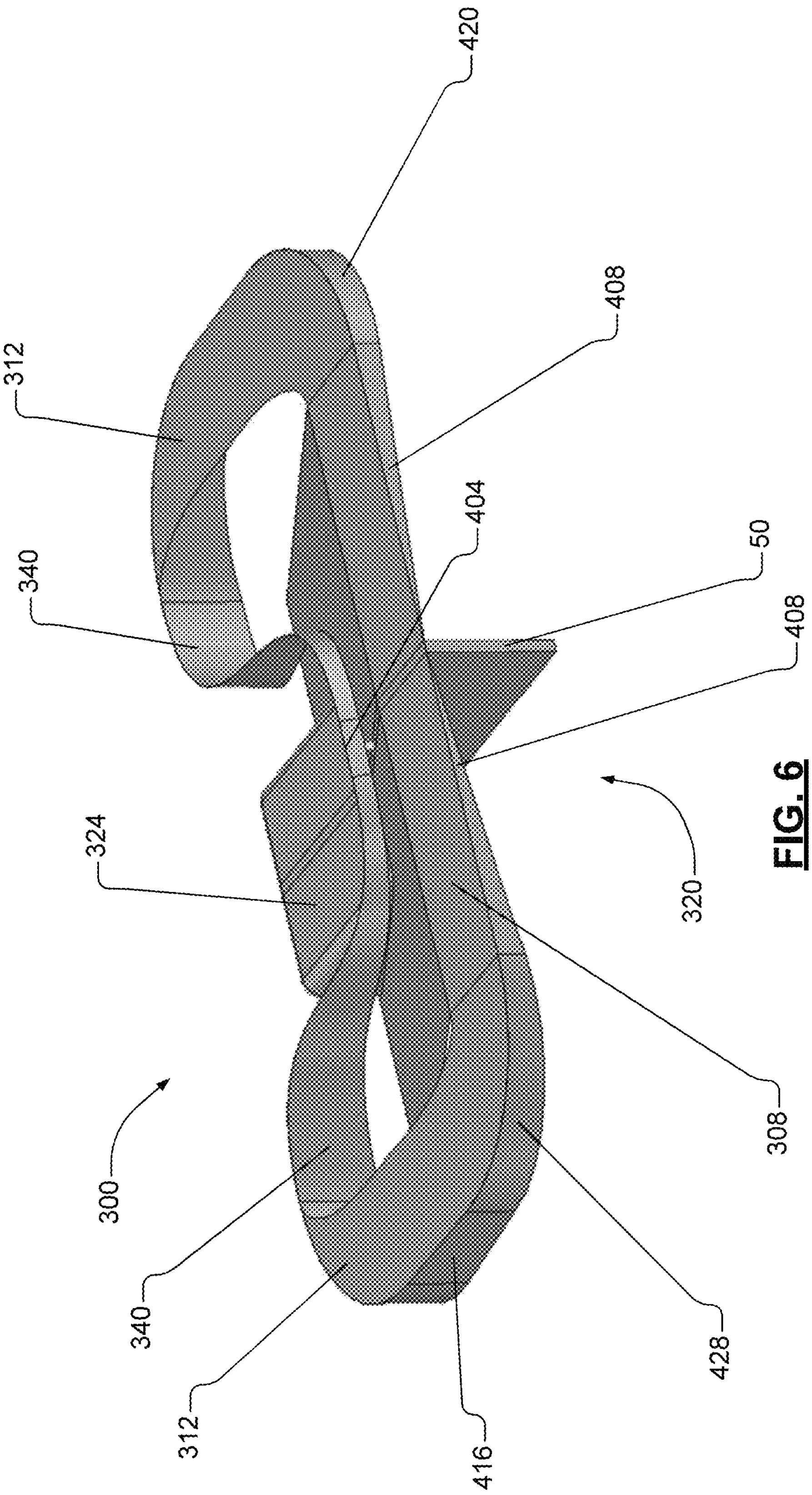

FIGS. 5 and 6 are perspective views of the example implementation of the UWB antenna 300 of the present application. FIG. 5 shows a front right perspective view of the UWB antenna 300. FIG. 6 is a rear right perspective view of the UWB antenna 300.

Figure 7:
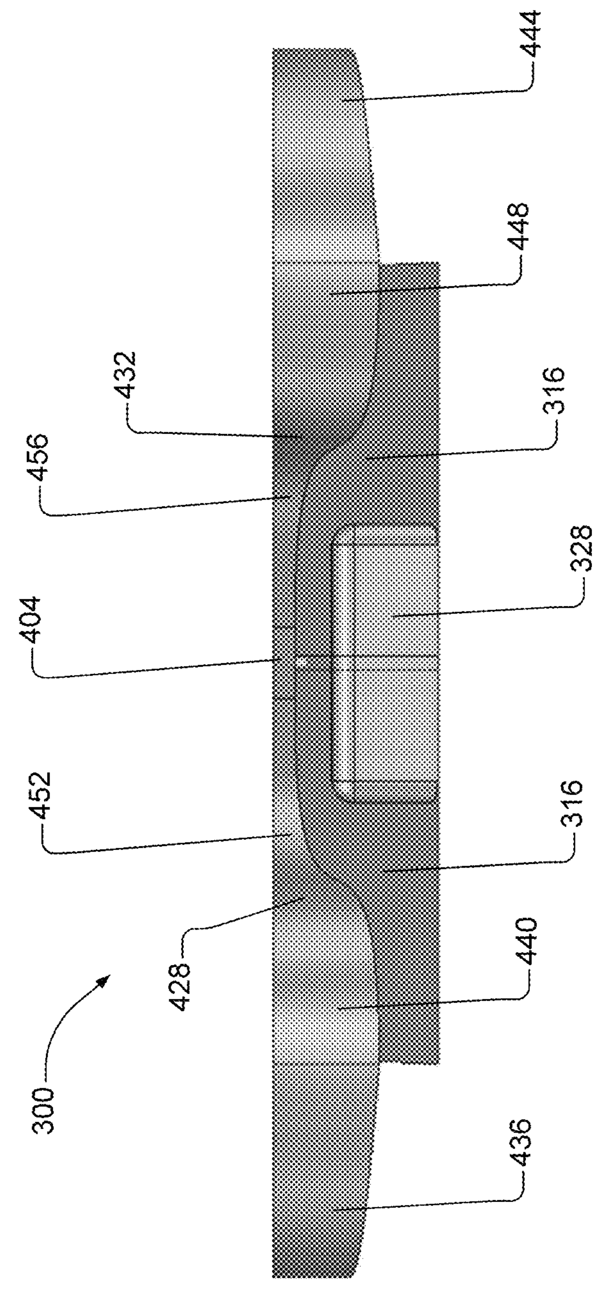
Figure 8:
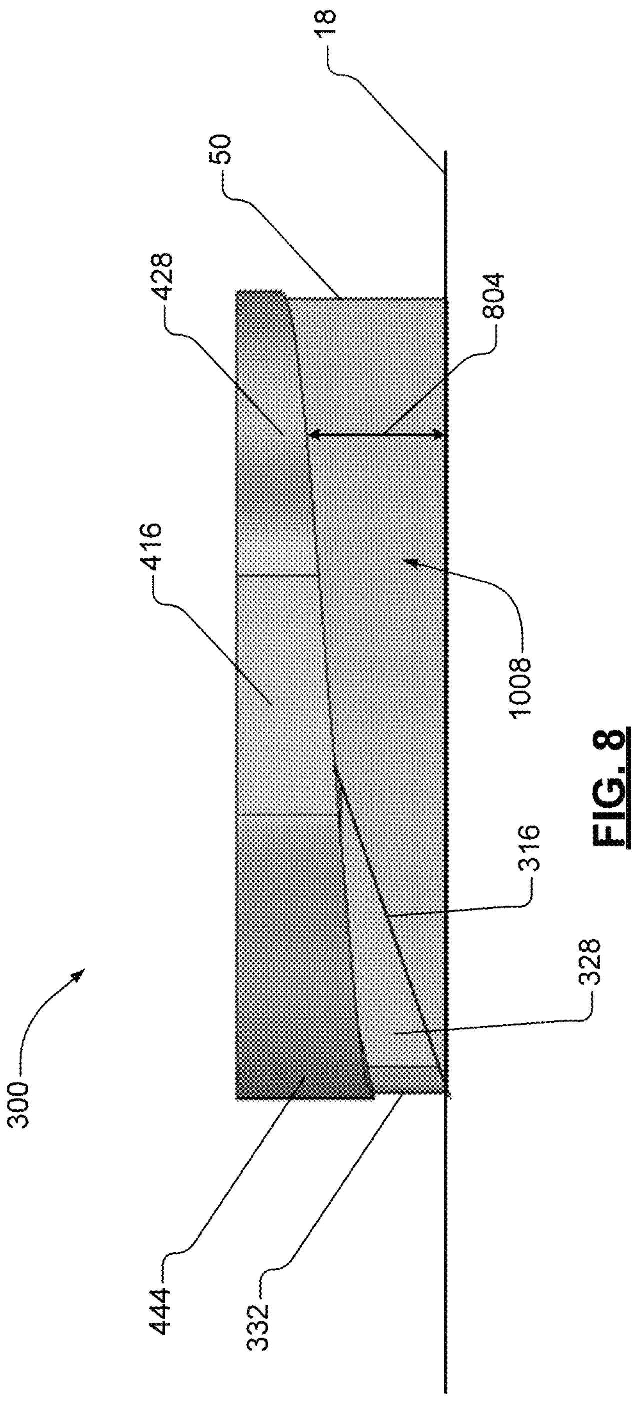
Figure 9:
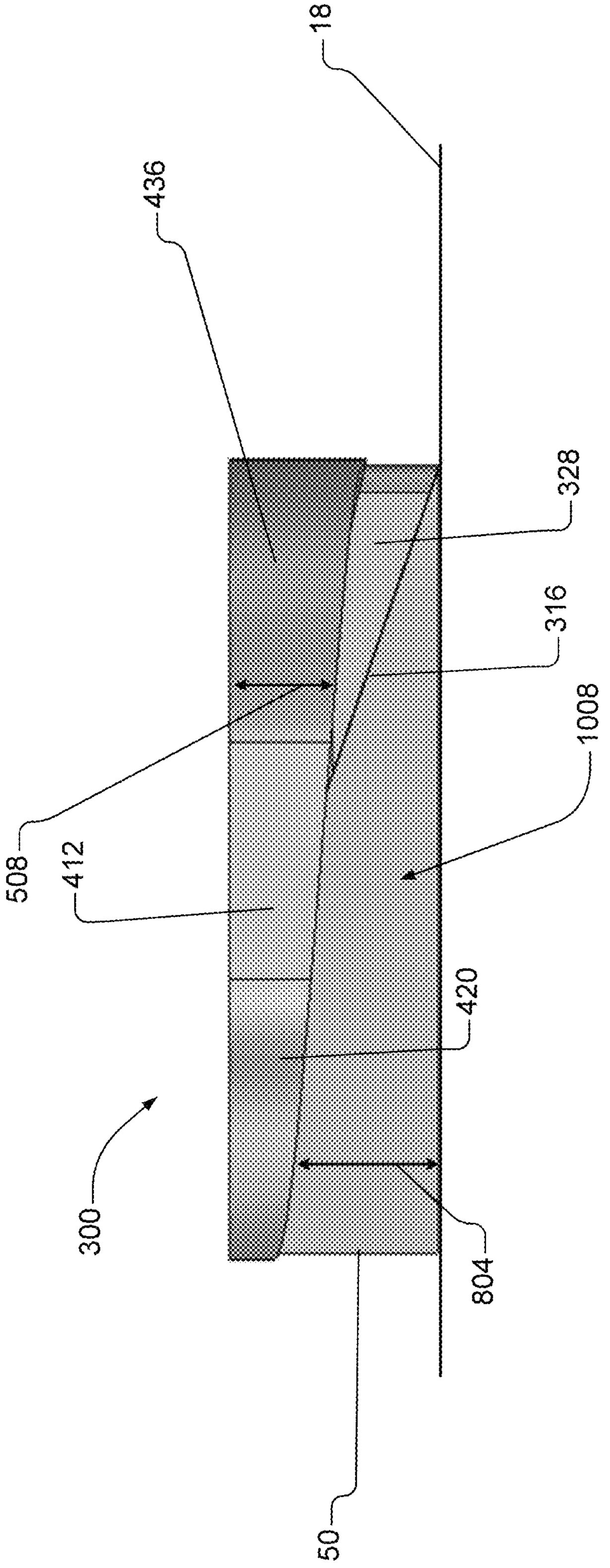
Figure 10:
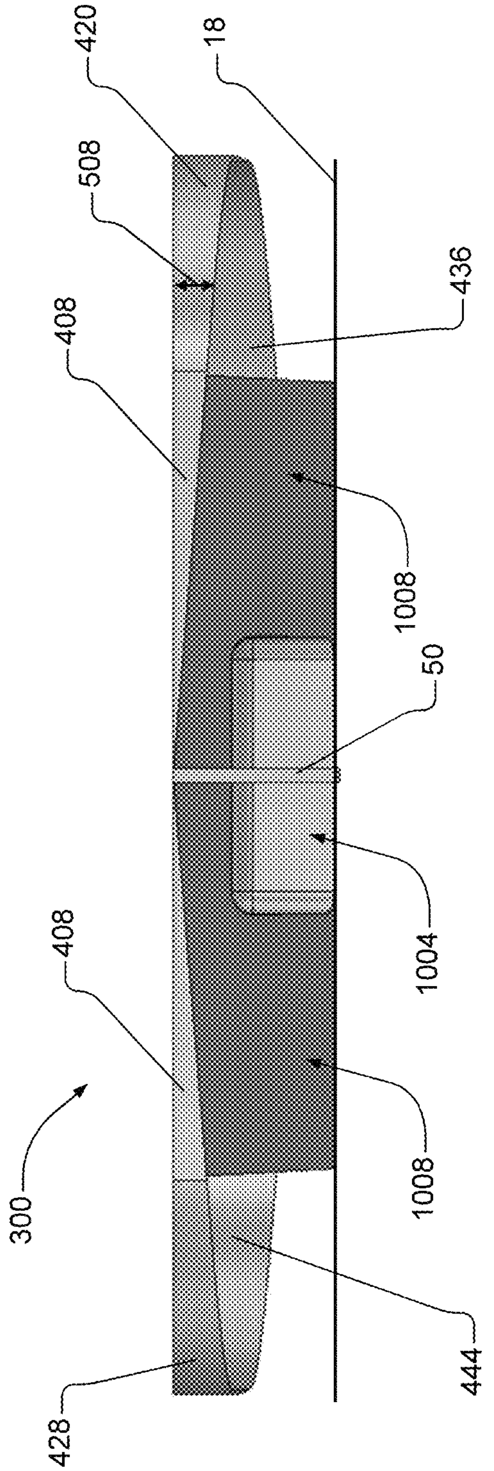

FIG. 7 is a front perspective view of the example implementation of the UWB antenna 300. FIGS. 8 and 9 are right and left side perspective views of the UWB antenna 300 relative to the point of view of FIG. 7. FIG. 10 is a rear perspective view of the example implementation of the UWB antenna 300. The rear is opposite the front of FIG. 7.

Referring to FIGS. 3-1, the UWB antenna 300 has a predetermined operating frequency range such as 600 megahertz (MHz) to 6 gigahertz (GHz) or another suitable operating frequency range. The operating frequency range(s) may be the same as discussed above with respect to FIGS. 1A-2C.

The UWB antenna 300 includes planar cap portions 308 and 312. Planes of the cap portions 308 and 312 are parallel to the ground plane 18. The UWB antenna 300 includes a tapered portion 316 that extends vertically downwardly toward the ground plane 18 and away from the cap portions 308.

A cavity backed portion 320 extends vertically upwardly from the tapered portion 316 and away from the ground plane 18. The cavity backed portion 320 includes a planar cap portion 324, side walls 328, and front wall 332. The side walls 328 may be perpendicular to the ground plane 18. The front wall 332 may be perpendicular to the ground plane 18. The plane of the cap portion 324 is parallel to the plane of the cap portions 308 and 312 and parallel to the ground plane 18. A plane of the front face 332 may extend forward to a front edge 504 of the tapered portion 316, such as illustrated in FIGS. 3-5.

An empty cavity 1004 is formed by the cavity backed portion 320 and is disposed vertically between the bottom side of the cap portion 324 and the ground plane 18 as illustrated in the example of FIG. 10. A cavity 1008 is also disposed vertically between the bottom of the tapered portion 316 and the ground plane 18.

As illustrated in FIGS. 6 and 10, the connecting portion 50 extends vertically downwardly from a bottom surface of the cap portions 308 and to the ground plane 18. The connecting portion 50 electrically connects the UWB antenna 300 to the ground plane 18. As illustrated in FIG. 3, the UWB antenna 300 may be symmetrical about a vertical plane 328 through both (a) the feed 304 and (b) a center of the connecting portion 50.

A tapered side portion 340 extends vertically downwardly from the cap portions 308 and 312. The side portion 340 may be perpendicular to the ground plane 18. Portions of the side portion 340 extend vertically above the tapered portion 316. The side portion 340 connects to the feed 304. As illustrated, instead of extending vertically above the front edge 504 of the tapered portion 316, the side portion 340 folds back and extends toward the cap portions 308 before turning toward the plane 340 and connecting to the feed 304.

As shown in FIG. 4, the side portion 340 includes a planar front portion 404 that extends horizontally left and right of the plane 328 when viewed from above. The side portion 340 includes a planar rear portion 408 that extends horizontally left and right of the plane 328 when viewed from above. The planes of the front and rear portions 404 and 408 are parallel.

The side portion 340 includes a planar left most portion 412 that extends along a plane that is parallel to the plane 328. The side portion 340 includes a planar right most portion 416 that extends along a plane that is parallel to the plane 328. The side portion 340 includes a first curved portion 420 that connects the rear portion 408 with the left most side portion 412. The side portion 340 includes a second curved portion 424 that connects the rear portion 408 with the right most side portion 416. The first and second curved portions 420 and 424 have a first predetermined radius of curvature.

The side portion 340 includes a planar left inner portion 428 that extends along a plane that is non-parallel to the plane 328. The side portion 340 includes a planar right inner portion 432 that extends along a plane that is non-parallel to the plane 328. The side portion 340 includes third and fourth curved portions 436 and 440 that connect the left most side portion 412 with the left inner portion 428. The side portion 340 includes fifth and sixth curved portions 444 and 448 that connect the right most side portion 416 with the right inner portion 432. The third and fifth curved portions 436 and 444 have a second predetermined radius of curvature. The first and second predetermined radii of curvature may be the same or different values. The fourth and sixth curved portions 440 and 448 have a third predetermined radius of curvature. The second and third predetermined radii of curvature may be the same or different values. If the second and third predetermined radii of curvature are the same value, the third and fourth curved portions 436 and 440 may be considered one curved portion, and the fifth and sixth curved portions 444 and 448 may be considered a single curved portion.

The fourth and sixth curved portions 440 and 448 are disposed vertically above the tapered portion 316. The left and right inner portions 428 and 432 are also disposed vertically above the tapered portion 326.

The side portion 340 includes a seventh curved portion 452 that connects the left inner portion 428 with the front portion 404. The side portion 340 includes an eighth curved portion 456 that connects the right inner portion 432 with the front portion 404. The seventh and eighth curved portions 452 and 456 have a fourth predetermined radius of curvature. The fourth predetermined radius of curvature may a different value than the third predetermined radius of curvature.

As illustrated in FIGS. 5, 9, and 10, a vertical height 508 of the side portion 340 increases moving from the front portion 404 to the curved portion 440. The vertical height 508 increases symmetrically moving from the front portion 404 to the curved portion 448. The vertical height 508 of the side portion 340 decreases from the curved portion 436 to the center of the connecting portion 50 as better shown in FIGS. 9 and 10. The vertical height 508 decreases symmetrically moving from the curved portion 444 to the center of the connecting portion 50. The decrease in vertical height of the side portion 340 may be monotonic.

As illustrated in FIGS. 8 and 9, a gap/slot (vertical distance) 804 between the lower edge of the side portion 340 and the ground plane 18 increases from the curved portion 436 to the center of the connecting portion 50. The gap 804 also increases symmetrically moving from the curved portion 444 to the center of the connecting portion 50. The increase in vertical height of the gap 804 may be monotonic.

As illustrated in FIG. 5, a gap/slot (vertical distance) 512 between the lower edge of the side portion 340 and the tapered portion 316 decreases from the curved portion 440 to the center of the front portion 404 where the feed 304 connects to the front portion 44. The gap 512 also increases symmetrically moving from the curved portion 448 to the center of the front portion 404. The increase in vertical height of the gap 804 may be monotonic or non-monotonic.

Described herein is a volume/surface space saving design for the UWB 300. The UWB 300 saves packaging space. The UWB 300 may be, for example, approximately 30 percent smaller than other designs via the side portion connecting to the feed 304 partially above the cavity 1008.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. An ultra wide band (UWB) antenna, comprising:

a planar cap portion that is parallel to a ground plane;

a tapered portion that extends vertically away from the planar cap portion and toward the ground plane and that forms a cavity vertically between a bottom surface of the tapered portion and the ground plane; and a side portion that extends around a periphery of the planar cap portion, that extends vertically from the planar cap portion toward the ground plane, and that electrically connects to a feed at a point that is vertically above the cavity, wherein the side portion includes at least six curved portions.

2. An ultra wide band (UWB) antenna, comprising:

a planar cap portion that is parallel to a ground plane;

a tapered portion that extends vertically away from the planar cap portion and toward the ground plane and that forms a cavity vertically between a bottom surface of the tapered portion and the ground plane; and a side portion that extends vertically from the planar cap portion toward the ground plane and that electrically connects to a feed at a point that is vertically above the cavity, wherein the tapered portion includes a cavity backed portion that extends away from the tapered portion and toward a plane of the planar cap portion and that forms a second cavity vertically between the cavity backed portion and the ground plane.

3. The UWB antenna of claim 2 wherein the cavity backed portion includes a planar portion that lies on a plane that is parallel to the ground plane and parallel to the plane of the planar cap portion.

4. The UWB antenna of claim 3 wherein a plane of the planar portion is disposed between (a) the ground plane and (b) the plane of the planar cap portion.

5. The UWB antenna of claim 1 further comprising a connecting portion that is disposed between the planar cap portion and the ground plane and that electrically connects the planar cap portion to the ground plane.

6. The UWB antenna of claim 5 wherein the UWB antenna is symmetrical about a vertical plane through (a) a center of the connecting portion and (b) the feed.

7. The UWB antenna of claim 1 wherein the side portion is perpendicular to the planar cap portion and the ground plane.

8. The UWB antenna of claim 1 wherein at least portions of the side portion are disposed vertically above portions of the tapered portion.

9. The UWB antenna of claim 1 wherein the at least six curved portions are vertically planar.

10. The UWB antenna of claim 1 wherein the side portion includes eight curved portions.

11. The UWB antenna of claim 1 wherein at least two of the curved portions intersect a vertical plane of an edge of the tapered portion.

12. The UWB antenna of claim 1 wherein none of the planar cap portion is disposed vertically above the tapered portion.

13. The UWB antenna of claim 1 wherein a vertical height of the side portion varies.

14. The UWB antenna of claim 1 wherein a vertical distance between (a) a lower portion of the side portion and (b) the ground plane varies.

15. An ultra wide band (UWB) antenna, comprising:

a planar cap portion that is parallel to a ground plane;

a tapered portion that extends vertically away from the planar cap portion and toward the ground plane and that forms a cavity vertically between a bottom surface of the tapered portion and the ground plane; and a side portion that extends vertically from the planar cap portion toward the ground plane and that electrically connects to a feed at a point that is vertically above the cavity, wherein a vertical height of the side portion both increases and decreases at different portions of the side portion.

16. The UWB antenna of claim 1 wherein a vertical distance between (a) a lower portion of the side portion and (b) the ground plane both increases and decreases at different portions of the side portion.

17. The UWB antenna of claim 1 wherein a vertical distance between (a) a lower edge of the side portion and (b) the ground plane increases approaching a connecting portion that is electrically connected to the ground plane.

18. The UWB antenna of claim 1 wherein the planar cap portion, the tapered portion and the side portion are all made of an electrically conductive material.

19. A vehicle including:

a feed; and the UWB antenna of claim 1.

* * * * *